US011843455B2

(12) United States Patent
Bagrin

(10) Patent No.: US 11,843,455 B2
(45) Date of Patent: Dec. 12, 2023

(54) SYSTEMS AND METHODS FOR MONITORING NETWORK TRAFFIC

(71) Applicant: NEWCO OMNINET PURCHASER, LLC, Allen, TX (US)

(72) Inventor: Andrew Bagrin, Charlotte, NC (US)

(73) Assignee: NEWCO OMNINET PURCHASER, LLC, Allen, TX (US)

( * ) Notice: Subject to any disclaimer, the term of this patent is extended or adjusted under 35 U.S.C. 154(b) by 0 days.

(21) Appl. No.: 17/227,976

(22) Filed: Apr. 12, 2021

(65) Prior Publication Data

US 2022/0070075 A1 Mar. 3, 2022

Related U.S. Application Data

(63) Continuation of application No. 15/284,363, filed on Oct. 3, 2016, now Pat. No. 10,979,334.

(60) Provisional application No. 62/236,798, filed on Oct. 2, 2015.

(51) Int. Cl.
*H04L 43/10* (2022.01)
*H04L 45/74* (2022.01)
*H04L 45/00* (2022.01)
*H04L 45/02* (2022.01)

(52) U.S. Cl.
CPC ............. *H04L 43/10* (2013.01); *H04L 45/02* (2013.01); *H04L 45/72* (2013.01); *H04L 45/74* (2013.01)

(58) Field of Classification Search
CPC ......... H04L 43/10; H04L 45/02; H04L 45/72; H04L 45/74; H04L 41/0803; H04L 41/0895; H04L 43/0876
USPC .................................................. 370/392, 230
See application file for complete search history.

(56) References Cited

U.S. PATENT DOCUMENTS

| 10,979,334 | B1 | 4/2021 | Bagrin | |
|---|---|---|---|---|
| 2003/0223419 | A1* | 12/2003 | Yasaki | ..................... H04L 45/00 370/252 |
| 2007/0153699 | A1 | 7/2007 | Fernando et al. | |
| 2009/0028144 | A1* | 1/2009 | Blair | ..................... H04L 63/306 370/252 |
| 2009/0043911 | A1 | 2/2009 | Flammer et al. | |
| 2009/0110108 | A1 | 4/2009 | Kennedy et al. | |
| 2010/0150005 | A1 | 6/2010 | Gerber et al. | |

(Continued)

*Primary Examiner* — Gregory B Sefcheck
*Assistant Examiner* — Majid Esmaeilian
(74) *Attorney, Agent, or Firm* — Goodwin Procter LLP

(57) ABSTRACT

Systems and methods for monitoring network traffic. A server may receive data packets originated from a first remote computer system, the data packets having a destination of a second remote computer system. The server may determine a user of the first computer system and, based thereon, identify network traffic monitoring tools configured to connect to the server through respective distinct network addresses. The server may determine a routing path for the packets including a sequence of network addresses including the respective distinct addresses of the identified network traffic monitoring tools and a second network address corresponding to the second computer system. The second network address may be ordered after the respective distinct addresses of the identified network traffic monitoring tools in the sequence. The server may send, according to the routing path, the packets to the identified network traffic monitoring tools and the second computer system.

19 Claims, 7 Drawing Sheets

(56) References Cited

U.S. PATENT DOCUMENTS

| | | | |
|---|---|---|---|
| 2012/0113896 A1* | 5/2012 | Karol | H04W 40/08 370/328 |
| 2013/0124713 A1* | 5/2013 | Feinberg | G06F 11/3086 709/224 |
| 2014/0281760 A1* | 9/2014 | Yoshizawa | G06F 11/0787 714/57 |
| 2015/0319049 A1* | 11/2015 | Nachum | H04L 41/24 370/422 |
| 2016/0094636 A1 | 3/2016 | Carr et al. | |
| 2016/0223437 A1 | 8/2016 | Ajay et al. | |
| 2016/0234091 A1* | 8/2016 | Emmadi | H04L 43/062 |
| 2017/0026287 A1* | 1/2017 | Vinsel | H04L 45/66 |
| 2017/0255179 A1* | 9/2017 | Kaneider | G05B 19/0428 |

* cited by examiner

SYSTEMS AND METHODS FOR MONITORING NETWORK TRAFFIC

CROSS REFERENCE TO RELATED APPLICATION(S)

This application is a continuation of U.S. patent application Ser. No. 15/284,363, titled "Systems and Methods for Monitoring Network Traffic" and filed Oct. 3, 2016, which claims priority to and the benefit under 35 U.S.C. § 119(e) of U.S. Provisional Patent Application No. 62/236,798, titled "Network Traffic Monitoring Framework" and filed on Oct. 2, 2015, each of which is hereby incorporated by reference herein in its entirety.

FIELD OF THE DISCLOSURE

The present disclosure relates generally to monitoring of network traffic. Some embodiments relate specifically to systems and methods for routing data packets through network traffic monitoring tools.

BACKGROUND

When communicating via many types of communication networks, including the Internet, computing devices generally send data packets that include a header and a payload. The header can include a source address (e.g., the Internet Protocol (IP) address of the device that sent the packet) and a destination address (e.g., the IP address of the device that is the intended recipient of the packet). These source and destination addresses may be used by network devices (e.g., gateways, routers, etc.) to route packets from the sender device to the destination device, and to route response packets from the destination device back to the sender device.

SUMMARY

According to an aspect of the present disclosure, a method is provided, comprising performing by a server system: receiving one or more data packets originated from a first remote computer system, the data packets having a destination of a second remote computer system; determining a user of the first remote computer system and, based thereon, identifying one or more of network traffic monitoring tools configured to connect to the server system through respective distinct network addresses; determining a routing path for the packets, the routing path comprising a sequence of network addresses including the respective distinct addresses of the identified network traffic monitoring tools and a second network address corresponding to the second remote computer system, the second network address being ordered after the respective distinct addresses of the identified network traffic monitoring tools in the sequence; and sending, according to the routing path, the packets to the identified network traffic monitoring tools and the second remote computer system.

According to another aspect of the present disclosure, a network traffic monitoring system is provided, comprising a server computer programmed to perform operations including: receiving one or more data packets originated from a first remote computer system, the data packets having a destination of a second remote computer system; determining a user of the first remote computer system and, based thereon, identifying one or more of network traffic monitoring tools configured to connect to the server computer through respective distinct network addresses; determining a routing path for the packets, the routing path comprising a sequence of network addresses including the respective distinct addresses of the identified network traffic monitoring tools and a second network address corresponding to the second remote computer system, the second network address being ordered after the respective distinct addresses of the identified network traffic monitoring tools in the sequence; and sending, according to the routing path, the packets to the identified network traffic monitoring tools and the second remote computer system.

According to another aspect of the present disclosure, a computer storage medium is provided, having instructions stored thereon that, when executed by data processing apparatus of a server computer, cause the data processing apparatus to perform operations including: receiving one or more data packets originated from a first remote computer system, the data packets having a destination of a second remote computer system; determining a user of the first remote computer system and, based thereon, identifying one or more of network traffic monitoring tools configured to connect to the server computer through respective distinct network addresses; determining a routing path for the packets, the routing path comprising a sequence of network addresses including the respective distinct addresses of the identified network traffic monitoring tools and a second network address corresponding to the second remote computer system, the second network address being ordered after the respective distinct addresses of the identified network traffic monitoring tools in the sequence; and sending, according to the routing path, the packets to the identified network traffic monitoring tools and the second remote computer system.

Particular implementations of the subject matter described in this specification can realize one or more of the following advantages. The network traffic monitoring techniques described herein may enable a cloud-based service to efficiently intercept data packets sent by multiple users and addressed to various destination devices, and route each intercepted data packet to one or more service providers not identified or addressed in the intercepted packet before sending the packet to the device at the destination address identified in the intercepted packet. In addition, such network traffic monitoring techniques may enable the cloud-based service to efficiently intercept return data packets sent by the destination devices to the users and optionally route each intercepted packet to one or more service providers not identified or addressed in the intercepted packet before sending the packet to the corresponding user.

These network traffic monitoring techniques may be implemented by a server system that maps the source addresses (e.g., IP addresses) associated with each user to a corresponding network address (e.g., the IP address of a sub-net or virtual local area network within the server system's domain) and inserts the corresponding network address into the source address field of the user's data packets, such that all responses to the data packet are automatically forwarded back to the server system. All data packets sent by the server system on behalf of a given user may have the network address corresponding to that user in the source address field, and all data packets received by the server system on behalf of a given user may have the network address corresponding to that user in the destination address field. Thus, the server system can efficiently determine which user is the originator or ultimate destination of the packets.

Other aspects and advantages of the invention will become apparent from the following drawings, detailed description, and claims, all of which illustrate the principles of the invention, by way of example only. The foregoing summary is intended to assist the reader in understanding the present disclosure, and does not in any way limit the scope of any of the claims.

BRIEF DESCRIPTION OF DRAWINGS

Various embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Figure 1:
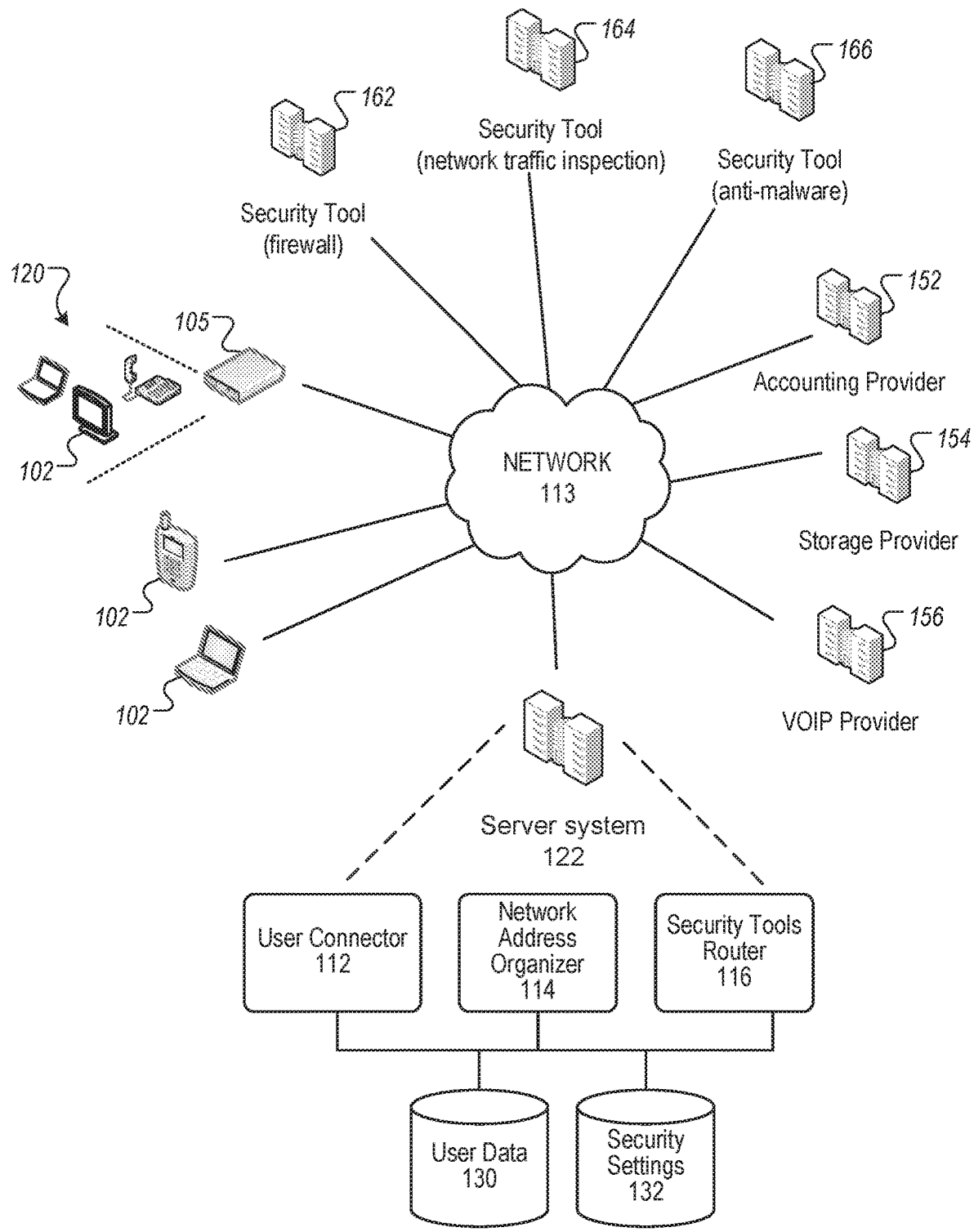
FIG. 1 shows a block diagram of a system for monitoring network traffic, according to some embodiments.

FIG. 1 illustrates an example system 122 for network traffic monitoring. In some embodiments, a server system 122 monitors network traffic to and/or from one or more client devices 102. The client devices 102 can be desktop computers, laptop computers, tablet computers, voice over Internet protocol (VOIP) phones, point of sale (POS) systems, mobile phones, smart watches, in-car information systems, and printers, for example. Other client devices 102 are possible. At least a subset of the client devices 102 can be part of a computer network 120. The computer network 120 can be, for example, a wired or wireless local area network (LAN) behind a gateway or router 105. The client devices 102 and the computer network 120 can connect to one or more communication networks 113 (e.g., the Internet).

In some embodiments, a client device 102 communicates through the network(s) 113 with servers of one or more service providers, for example, a server 152 of an accounting service provider, a server 154 of a storage provider, a server 156 of a VOIP service provider, etc. For instance, back-up software on a client device 102 (e.g., a laptop computer) can periodically send new files to servers 154 of the storage provider, and receive files or status information relating to files stored by the storage provider via the servers 154. In some embodiments, data transmitted between the client device 102 and the storage provider's server 154 can be directed through the server system 122, which can monitor the network traffic between the client device 102 and the storage provider's servers 154 for security risks (e.g., unauthorized access, malicious software ("malware"), etc.).

In some embodiments, the server system 122 comprises software components (112, 114, 116) and databases (130, 132) deployed, for example, at one or more data centers in one or more geographic locations. The server system 122 software components can include, for example, a user connector 112, a network address organizer 114, and a security tools router 116. The software components can include subcomponents that can execute on the same or different individual data processing apparatus. A data processing apparatus can be a physical computing system or a virtual machine, for example. Some examples of data processing apparatus and attributes thereof are described in further detail below. The server system 122 databases can include, for example, a user data database 130 and a security settings database 132. The databases can reside in one or more physical storage systems. The software components and databases are described in further detail below.

In some embodiments, the server system 122 utilizes security tools and/or network traffic monitoring tools to monitor network traffic between a client device 102 and devices (e.g., servers) of one or more service providers. Examples of security tools can include firewall applications, network traffic inspection applications, and anti-malware application. Other examples of security tools are possible. A security tool can be implemented by one or more software and/or hardware components executing on one or more physical or virtual machines.

In some embodiments, the sever system 122 monitors network traffic between client devices 102 and service providers by routing the network traffic through one or more of the security tools. For instance, for inbound network traffic (e.g., data packets) originated from a client device 102 and addressed to a service provider such as the storage provider 154, the server system 122 can route the data packets through a first security tool 162 (e.g., a firewall application), a second security tool 164 (e.g., a network traffic inspection application), and/or a third security tool 166 (e.g., an anti-malware application). Each security tool through which the data packets are routed can inspect and monitor the data packets, before the data packets are sent to the storage provider 154. More particularly, the server system 122 can select some or all of the available security tools, create a routing path that includes the selected security tools, and send the data packets through the selected security tools according to the routing path, before sending the data packets to the storage provider 154, as described in more detail below.

Figure 2:
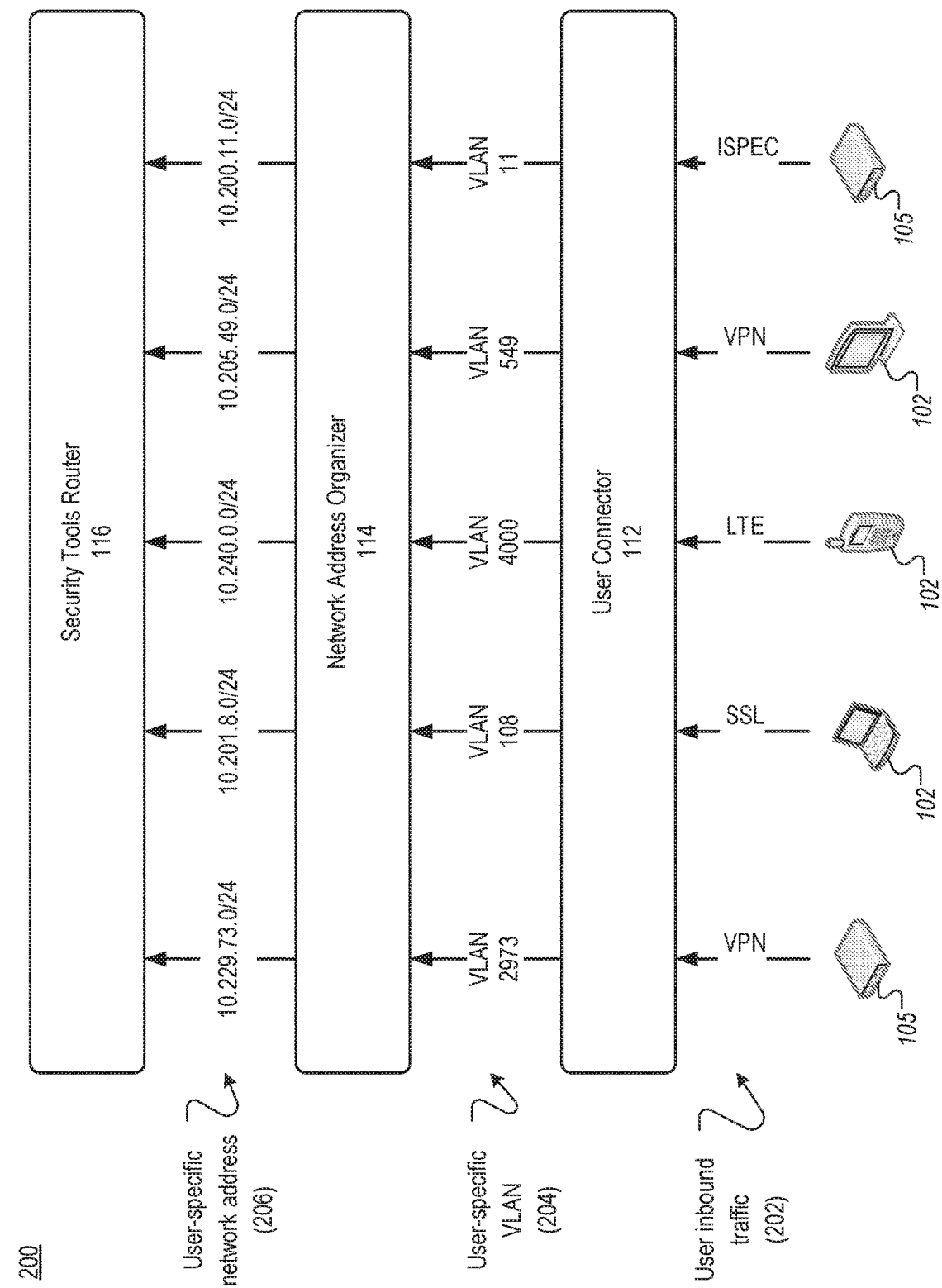
FIG. 2 shows an example of a data flow diagram of network traffic in a system for monitoring network traffic.

FIG. 2 illustrates routing of inbound network traffic (e.g., data packets) within the server system 122, according to some embodiments. In the example of FIG. 2, client devices 102 and gateways 105 of a user (e.g., an individual, or a company) connect to the user connector 112 (of the server system 122) through respective connections 202. The connections 202 can be based on protocols including, for example, virtual private network (VPN), secure socket layer (SSL), long-term evolution (LTE) cellular connection, and Internet protocol security (ISPEC). Other connection protocols are possible.

To ensure isolation (within the server system 122) of network traffic corresponding to different users and proper routing of return traffic to respective users, the user connector 112 can map each user's inbound traffic 202 to a distinct (user-specific) virtual local area network (VLAN) 204 in the server system 122. The user connector 112 can determine whether an inbound data packet originates from a particular user by the packet's originating network address, for example. For instance, the user data database 130 can store one or more originating network addresses specific to each user. An originating network address can be, for example, an Internet Protocol (IP) address or Classless Inter-Domain Routing (CIDR) IP address. Other types of originating network addresses are possible. The user connector 112 can inspect an inbound data packet for its originating network address, and access the user data database 130 to identify the user corresponding to the originating network address. The user connector 112 can then assign the inbound data packet to a particular VLAN that is specific to the corresponding user by, for example, inserting a tag (label) into the inbound data packet.

In some embodiments, the network address organizer 114 maps each user-specific VLAN 204 to a user-specific network address 206 (which may be internal to the server system 122, or internal to the network domain of the provider of the server system 122, etc.). A user-specific network address can be, for example, an Internet Protocol (IP) address or Classless Inter-Domain Routing (CIDR) IP address. Other types of user-specific network addresses are possible. For instance, in the example of FIG. 2, the user-specific VLAN 2973 is mapped to the user-specific network address 10.229.73.0/24, and the user specific VLAN 108 is mapped to the user-specific network address 10.201.8.0/24. In this way, the originating network address of a user's inbound data packet (of the user inbound traffic 202) can be translated to a user-specific network address (as the source address of the inbound data packet), which can be internal to the server system 122.

In some embodiments, the server system 122 or a component thereof (e.g., the user connector 112, the network address organizer 114) can maintain and update a mapping table in the user data database 130. The mapping table records mappings between a user's network address(es) and a corresponding user-specific VLAN (204), and between the user-specific VLAN (204) and a corresponding user-specific network address (206).

The server system 122 can utilize some or all available security tools, for example, based on a user's needs or preferences. For instance, a particular user may specify only needing firewall and anti-malware applications but no need for a network traffic inspection security application. The server system 122 can store the user's selection of security tools in the security settings database 132, for example.

To route a user's data packets through one or more remote (e.g., cloud-based) security tools, the security tools router 116 can provide a routing path for the packets that routes the packets through the security tools. In some embodiments, the security settings database 132 identifies one or more security tools associated with a user (e.g., based on a packet's user-specific network address 206, or on a user identifier, etc.). The security tools router 116 can use this information to determine a routing path for the user's packets that routes the packets through the specified security tools, as described further below in reference to FIGS. 3-5.

Figure 3:
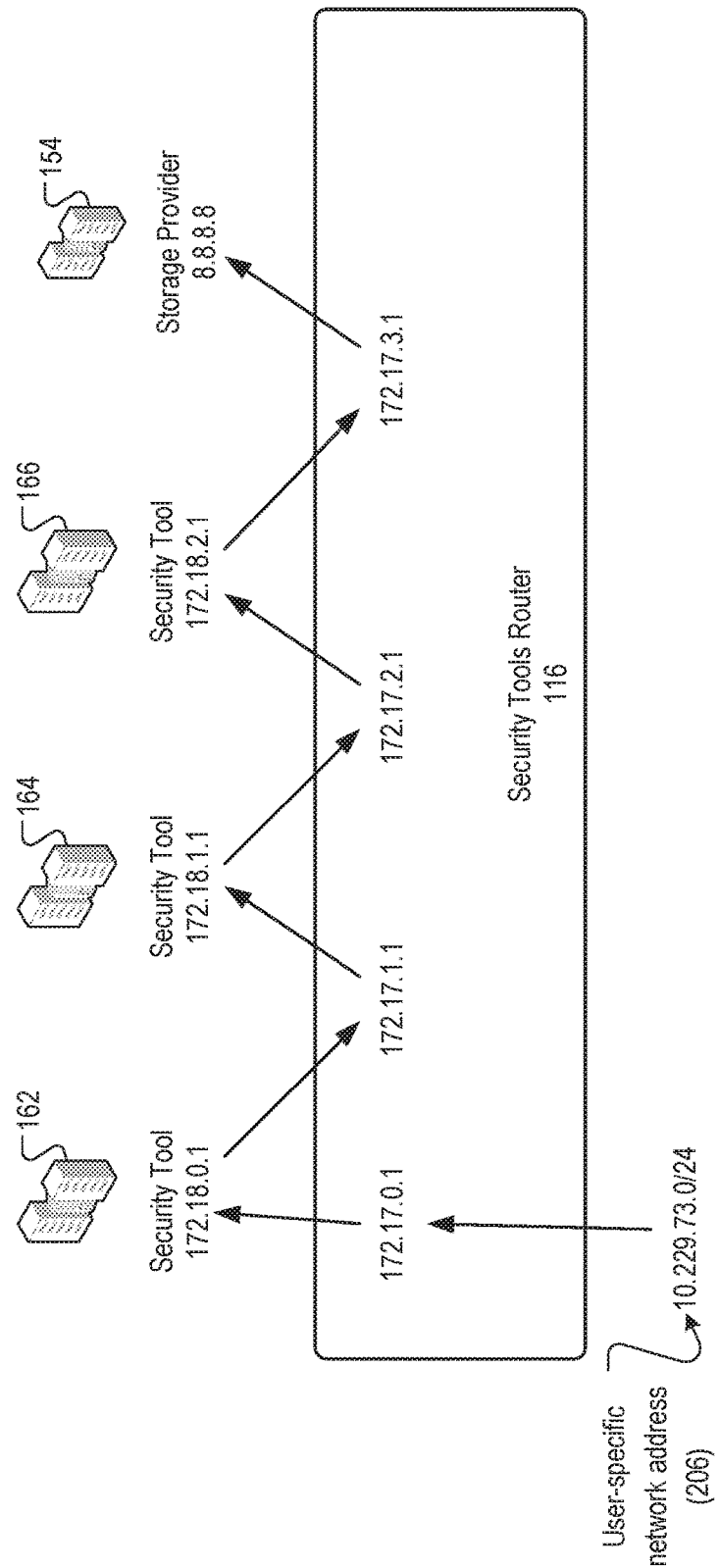
FIG. 3 shows an example of a routing path for network traffic originating from a user.

FIG. 3 shows an example routing path for data packets originated from a user's client device 105 and addressed to the server 154 of a storage provider. As described above, the data packets may be labeled with a user-specific network address (206) that is unique to the user of the originating client device 105. The security tools router 116 can construct a routing path that sequentially routes the data packets to the security tools associated with the user. For instance, assuming that the selected security tools are the security tools 162, 164, and 166, the security tools router 116 can construct a routing path of a sequence of network addresses including network addresses of the security tools 162, 164, and 166. The routing path can also include one or more additional network addresses representing the security tools router 116 or the server system 122; these additional network addresses can be interleaved in the routing path with the network addresses of the selected security tools 162, 164, and 166. In the example of FIG. 3, the routing path ends with a network address for a server 154 of the storage provider as a final destination. A network address in the routing path can be an Internet Protocol (IP) address or Classless Inter-Domain Routing (CIDR) IP address. Other types of network addresses are possible. In the example of FIG. 3, the illustrated routing path includes the following network addresses:

172.17.0.1 (server system 122)
172.18.0.1 (security tool 162)
172.17.1.1 (server system 122)
172.18.1.1 (security tool 164)
172.17.2.1 (server system 122)
172.18.2.1 (security tool #3)
172.17.3.1 (server system 166)
8.8.8.8 (storage provider 154)

In the example of FIG. 3, each of the user's data packets is sent, as shown with the arrows in FIG. 3, to the selected security tools, then to the server 154 of the storage provider according to the routing path. In the example of FIG. 3, after being inspected by a selected security tool, each data packet is sent back to the security tools router 116 before being sent to a next security tool, or to the server 154 of the storage provider 154. By having data packets sent back to the security tools router 116 after inspection by each security tool, the security tools router 116 can easily arrange ordering of the security tools, or adding or subtracting security tools, without having a particular security tool take on responsibility for routing. Before sending a packet to the server 154 of the storage provider, the security tools router 116 can translate the originating network address of the data packet to another network address that represents the server system 122 to devices external to the server system 122. In this way, further data packets returned from the storage provider to the user's client device can be first routed to the server system 122 for network traffic monitoring, for example, by following the routing path in the reversed order. After being routed following the routing path in the reversed order and inspected by the selected security tools, the data packets can be routed back to the user's client device following the mapping table described earlier (in reference to FIG. 2) that maps a user-specific network address 206 to a corresponding user-specific VLAN 204, and back to the user's original originating network address.

Figure 4:
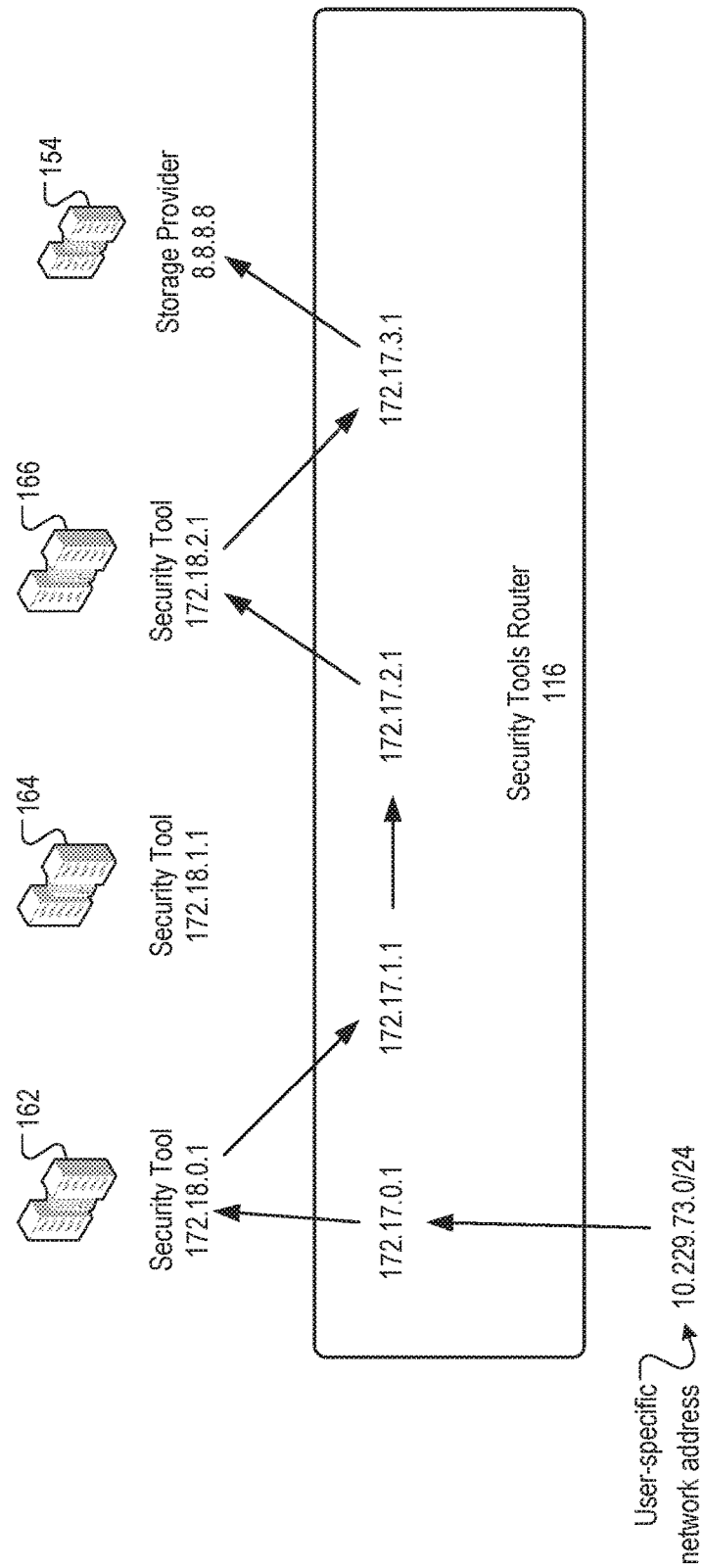
FIG. 4 shows another example of a routing path for network traffic originating from a user.

FIG. 4 shows another example routing path for data packets originated from a user's client device 105 and addressed to the server 154 of a storage provider. In this example, the selected security tools are the security tools 162 and 166. In this example, the security tools router 116 constructs a routing path that sends the data packets to the selected security tools 162 and 166 sequentially. In this example, the routing path also includes additional network addresses representing the security tools router 116 or the server system 122, and ends with a network address of the server 154 of the storage provider as a final destination. In the example of FIG. 4, the illustrated routing path includes the following network addresses:

172.17.0.1 (server system 122)
172.18.0.1 (security tool 162)
172.17.1.1 (server system 122)
172.17.2.1 (server system 122)
172.18.2.1 (security tool 166)
172.17.3.1 (server system 122)
8.8.8.8 (storage provider 154)

In the example of FIG. 4, each of the user's data packets is sent, as shown with the arrows in FIG. 4, to the selected security tools 162 and 166, then to the storage provider 154 according to the routing path. When a data packet has been inspected by the security tool 162 and sent back to the address 172.17.1.1 of the security tools router 116, the packet skips the security tool 164 (not selected in this example) by "hopping" (being sent) to a next network address 172.17.2.1 of the security tools router 116, according to the routing path.

Figure 5:
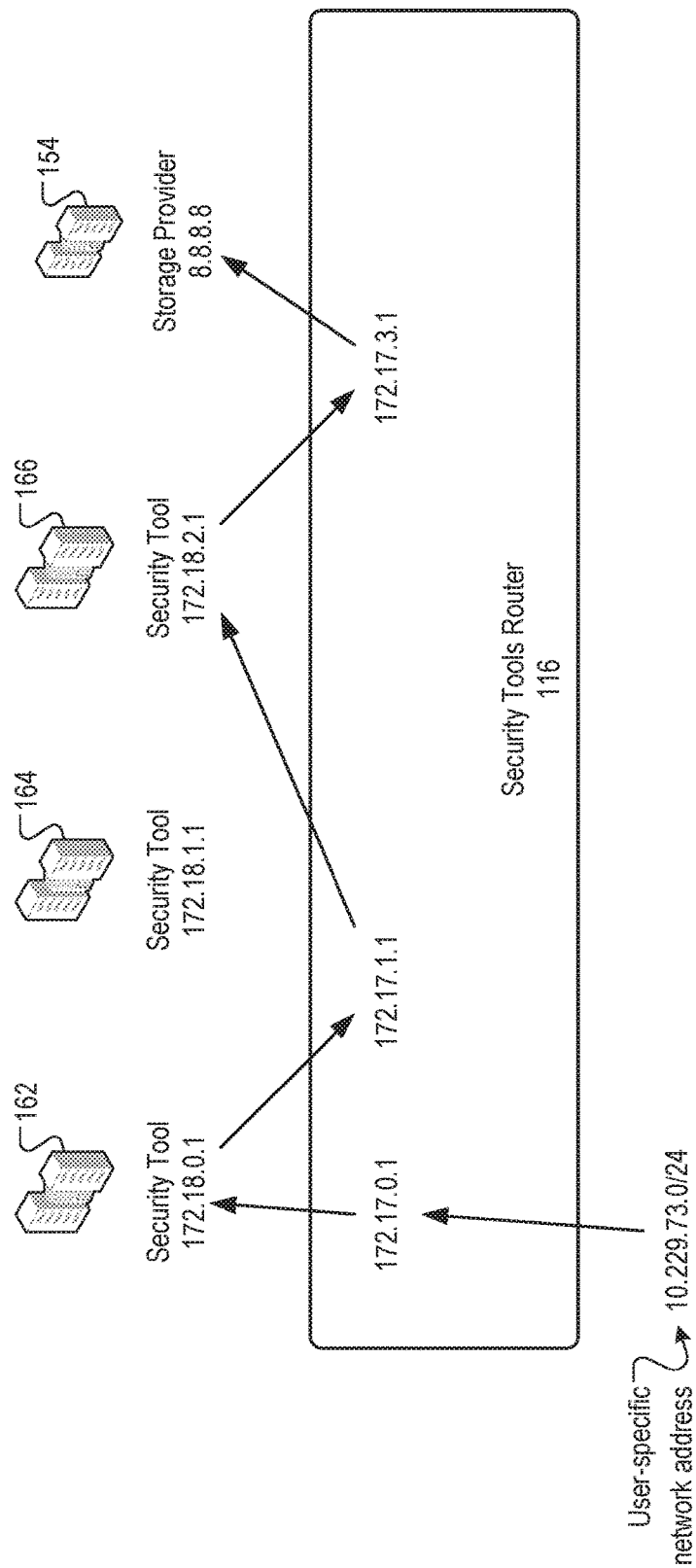
FIG. 5 shows yet another example of a routing path for network traffic originating from a user.

FIG. 5 shows yet another example routing path for data packets originated from a user's client device 105 and addressed to the server 154 of a storage provider. In this example, the selected security tools are the security tools 162 and 166, which are the same security tools selected in the example of FIG. 4. After being inspected by the security tool 162 and routed back to the security tools router 116, instead of skipping the not-selected security tool 164 by hopping to a next network address of the security tools router 116, a data packet is directly sent to an address 172.17.2.1 of the next selected security tool 166. As shown with the arrows in the example of FIG. 5, the illustrated routing path includes:

172.17.0.1 (server system 122)
172.18.0.1 (security tool 162)
172.17.1.1 (server system 122)
172.18.2.1 (security tool 166)
172.17.3.1 (server system 122)
8.8.8.8 (storage provider 154)

In addition to routing data packets to a user's selected security tools as described above, the security tools router 116 can dynamically change the route for the data packets to different security tools. For instance, the security tools router 116 can receive an alert from a particular security tool (e.g., an anti-malware security tool) about potential problems with the data packets the particular security tool just inspected. Based on the alert, the security tools router 116 can route the data packets first to another security system (e.g., a quarantine system) that is not part of the previously selected security tools, or route the data packets to "null" (i.e., dropping the data packets). The security tools router 116 can dynamically route data packets (e.g., of a connection session) by maintaining a state of the data packets, for example, based on attributes of the data packets. Attributes (e.g., "5-tuple") of the data packets can include source IP address, source port, destination IP address, destination port, and destination protocol (e.g., Transmission Control Protocol or TCP). Other attributes are possible.

Figure 6:
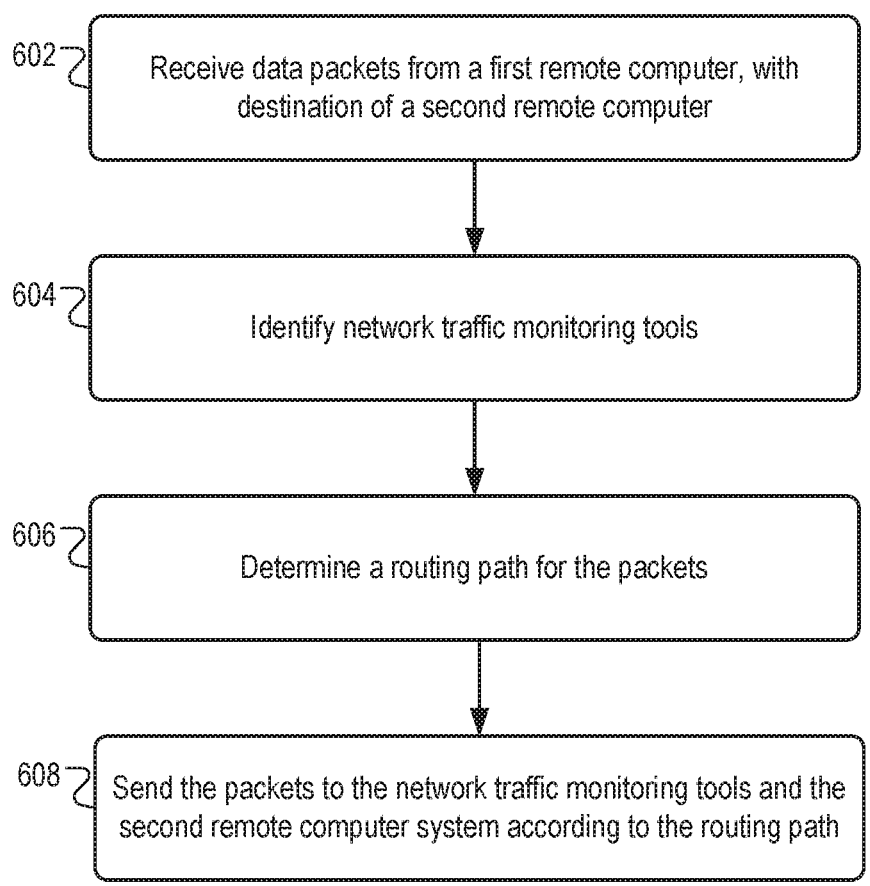
FIG. 6 shows a flow chart of a method for monitoring network traffic, according to some embodiments.

FIG. 6 is a flow chart of an example method 600 for routing data packets through network traffic monitoring tools. The method can be implemented using software components executing on one or more data processing apparatus that are part of one or more servers (e.g., in a data center), for example. The method includes a step 602 of receiving one or more data packets originated from a first remote computer system. The data packets may have a destination address of a second remote computer system (e.g., the address of a server 154 of a storage provider). This step may be performed, for example, by the user connector 112.

The method further includes a step 604 of determining a user of the first remote computer system and, based thereon, identifying one or more network traffic monitoring tools configured to connect to the server system through respective distinct network addresses. This step may be performed, for example, by the security tools router 116.

The method further includes a step 606 of determining a routing path for the packets, the routing path comprising a sequence of network addresses including the respective distinct addresses of the identified network traffic monitoring tools and a second network address corresponding to the second remote computer system, the second network address being ordered after the respective distinct addresses of the identified network traffic monitoring tools in the sequence. The step may be performed, for example, by the security tools router 116.

The method further includes a step 608 of sending, according to the routing path, the packets to the identified network traffic monitoring tools and the second remote computer system. The step may be performed, for example, by the security tools router 116.

Further Description of Some Embodiments

Some embodiments of the subject matter and the operations described in this specification can be implemented in digital electronic circuitry, or in computer software, firmware, or hardware, including the structures disclosed in this specification and their structural equivalents, or in combinations of one or more of them. Some embodiments of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Some embodiments of the operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Some embodiments of The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both.

Figure 7:
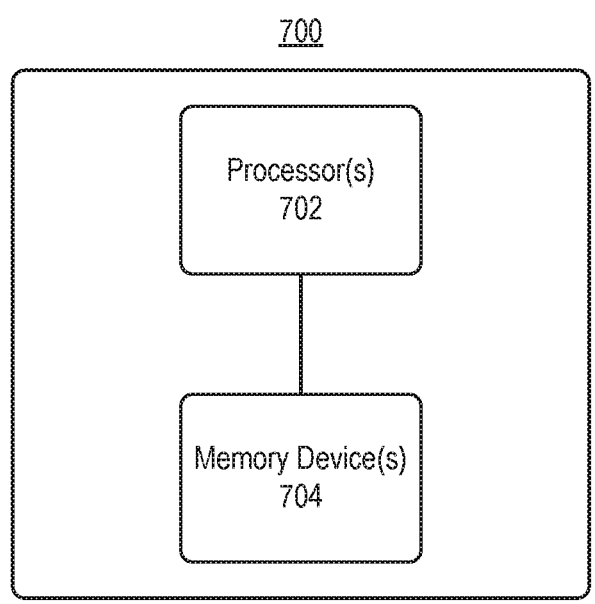
FIG. 7 shows a block diagram of a computer system suitable for practicing some embodiments.

FIG. 7 shows a block diagram of a computer 700. The elements of the computer 700 include one or more processors 702 for performing actions in accordance with instructions and one or more memory devices 704 for storing instructions and data. In some embodiments, one or more programs executing on one or more computers 700 can control the computer(s) to perform the methods described herein and/or to implement the systems described herein. Different versions of the program(s) executed by the computer(s) 700 may be stored, distributed, or installed. Some versions of the software may implement only some embodiments of the methods described herein.

Generally, a computer 700 will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Terminology

The phraseology and terminology used herein is for the purpose of description and should not be regarded as limiting.

The terms "approximately" or "substantially", the phrases "approximately equal to" or "substantially equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Equivalents

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method comprising:
 performing by a data packet processing system:
  receiving one or more data packets originated from a first remote computer system, the one or more data packets having a destination of a second remote computer system;
  determining, based on the one or more data packets, an identifier of an entity associated with the first remote computer system,
  based on the identifier of the entity, identifying a plurality of network traffic monitoring tools to be applied to the one or more data packets in a first ordered sequence, wherein each of the network traffic monitoring tools in the plurality of network monitoring tools has a respective address;

obtaining a second ordered sequence of the respective addresses of the plurality of network traffic monitoring tools, wherein a position of each of the network traffic monitoring tools in the first ordered sequence of the network traffic monitoring tools matches a position of the respective address of each of the network traffic monitoring tools in the second ordered sequence of the respective addresses of the plurality of network traffic monitoring tools;

applying the network traffic monitoring tools to the one or more data packets in the first ordered sequence by accessing the respective addresses of the plurality of network traffic monitoring tools in the second ordered sequence;

after applying the network traffic monitoring tools to the one or more data packets in the first ordered sequence and before sending the one or more data packets to the second remote computer system, applying a particular network traffic monitoring tool to the one or more data packets based on a security alert provided by at least one of the plurality of network traffic monitoring tools; and sending the one or more data packets to the second remote computer system, the network traffic monitoring tools having been applied to the one or more data packets before the one or more data packets arrive at the second remote computer system, wherein the security alert is provided by the at least one of the plurality of network traffic monitoring tools based on application of the at least one of the plurality of network traffic monitoring tools to the one or more data packets, and wherein the particular network traffic monitoring tool is not included in the plurality of network traffic monitoring tools.

2. The method of claim 1, wherein the data packet processing system is a physical computing system or a virtual machine.

3. The method of claim 1, wherein the particular network traffic monitoring tool of the plurality of network monitoring tools is configured to execute on a physical computing system or on a virtual machine.

4. The method of claim 1, wherein the respective addresses of the plurality of network traffic monitoring tools include network addresses of the plurality of network traffic monitoring tools.

5. The method of claim 4, wherein the network addresses of the plurality of network traffic monitoring tools include one or more Internet Protocol (IP) addresses and/or one or more Classless Inter-Domain Routing (CIDR) addresses.

6. The method of claim 4, wherein applying the network traffic monitoring tools to the one or more data packets in the first ordered sequence by accessing the respective addresses of the plurality of network traffic monitoring tools in the second ordered sequence comprises routing the one or more data packets to the respective addresses of the plurality of network monitoring tools according to the second ordered sequence of the respective addresses.

7. The method of claim 1, wherein the respective addresses of the plurality of network traffic monitoring tools include locations of one or more of the plurality of network traffic monitoring tools on a computer storage medium.

8. The method of claim 7, wherein the computer storage medium comprises a memory device.

9. The method of claim 1, wherein the particular network traffic monitoring tool is selected based on the security alert.

10. A system, comprising:
at least one data packet processing computer programmed to perform operations including:
receiving one or more data packets originated from a first remote computer system, the one or more data packets having a destination of a second remote computer system;

determining, based on the one or more data packets, an identifier of an entity associated with the first remote computer system, based on the identifier of the entity, identifying a plurality of network traffic monitoring tools to be applied to the one or more data packets in a first ordered sequence, wherein each of the network traffic monitoring tools in the plurality of network monitoring tools has a respective address;

obtaining a second ordered sequence of the respective addresses of the plurality of network traffic monitoring tools, wherein a position of each of the network traffic monitoring tools in the first ordered sequence of the network traffic monitoring tools matches a position of the respective address of each of the network traffic monitoring tools in the second ordered sequence of the respective addresses of the plurality of network traffic monitoring tools;

applying the network traffic monitoring tools to the one or more data packets in the first ordered sequence by accessing the respective addresses of the plurality of network traffic monitoring tools in the second ordered sequence;

after applying the network traffic monitoring tools to the one or more data packets in the first ordered sequence and before sending the one or more data packets to the second remote computer system, applying a particular network traffic monitoring tool to the one or more data packets based on a security alert provided by at least one of the plurality of network traffic monitoring tools; and sending the one or more data packets to the second remote computer system, the network traffic monitoring tools having been applied to the one or more data packets before the one or more data packets arrive at the second remote computer system, wherein the security alert is provided by the at least one of the plurality of network traffic monitoring tools based on application of the at least one of the plurality of network traffic monitoring tools to the one or more data packets, and wherein the particular network traffic monitoring tool is not included in the plurality of network traffic monitoring tools.

11. The system of claim 10, wherein the data packet processing computer comprises a physical computing system or a virtual machine.

12. The system of claim 10, wherein the particular network traffic monitoring tool of the plurality of network monitoring tools is configured to execute on a physical computing system or on a virtual machine.

13. The system of claim 10, wherein the respective addresses of the plurality of network traffic monitoring tools include network addresses of the plurality of network traffic monitoring tools.

14. The system of claim 13, wherein the network addresses of the plurality of network traffic monitoring tools include one or more Internet Protocol (IP) addresses and/or one or more Classless Inter-Domain Routing (CIDR) addresses.

15. The system of claim 13, wherein applying the network traffic monitoring tools to the one or more data packets in the first ordered sequence by accessing the respective addresses of the plurality of network traffic monitoring tools in the second ordered sequence comprises routing the one or more data packets to the respective addresses of the plurality of network monitoring tools according to the second ordered sequence of the respective addresses.

16. The system of claim 10, wherein the respective addresses of the plurality of network traffic monitoring tools include locations of one or more of the plurality of network traffic monitoring tools on a computer storage medium.

17. The system of claim 16, wherein the computer storage medium comprises a memory device.

18. The system of claim 10, wherein the particular network traffic monitoring tool is selected based on the security alert.

19. A computer storage medium having instructions stored thereon that, when executed by data processing apparatus of at least one data packet processing computer, cause the data processing apparatus to perform operations including:
- receiving one or more data packets originated from a first remote computer system, the one or more data packets having a destination of a second remote computer system;
- determining, based on the one or more data packets, an identifier of an entity associated with the first remote computer system,
- based on the identifier of the entity, identifying a plurality of network traffic monitoring tools to be applied to the one or more data packets in a first ordered sequence, wherein each of the network traffic monitoring tools in the plurality of network monitoring tools has a respective address;
- obtaining a second ordered sequence of the respective addresses of the plurality of network traffic monitoring tools, wherein a position of each of the network traffic monitoring tools in the first ordered sequence of the network traffic monitoring tools matches a position of the respective address of each of the network traffic monitoring tools in the second ordered sequence of the respective addresses of the plurality of network traffic monitoring tools;
- applying the network traffic monitoring tools to the one or more data packets in the first ordered sequence by accessing the respective addresses of the plurality of network traffic monitoring tools in the second ordered sequence;
- after applying the network traffic monitoring tools to the one or more data packets in the first ordered sequence and before sending the one or more data packets to the second remote computer system, applying a particular network traffic monitoring tool to the one or more data packets based on a security alert provided by at least one of the plurality of network traffic monitoring tools; and
- sending the one or more data packets to the second remote computer system, the network traffic monitoring tools having been applied to the one or more data packets before the one or more data packets arrive at the second remote computer system,
- wherein the security alert is provided by the at least one of the plurality of network traffic monitoring tools based on application of the at least one of the plurality of network traffic monitoring tools to the one or more data packets, and
- wherein the particular network traffic monitoring tool is not included in the plurality of network traffic monitoring tools.

* * * * *